(12) United States Patent
Hilbig, Jr. et al.

(10) Patent No.: US 10,046,265 B2
(45) Date of Patent: Aug. 14, 2018

(54) OXYGEN SEPARATION SYSTEM AND METHOD OF GENERATING A FLOW OF OXYGEN ENRICHED GAS

(71) Applicant: KONINKLIJKE PHILIPS N.V., Eindhoven (NL)

(72) Inventors: Rainer Hilbig, Jr., Aachen (DE); Achim Gerhard Rolf Koerber, Eindhoven (NL); Paul Van Der Sluis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 90 days.

(21) Appl. No.: 14/762,066

(22) PCT Filed: Jan. 26, 2014

(86) PCT No.: PCT/IB2014/058549
§ 371 (c)(1),
(2) Date: Jul. 20, 2015

(87) PCT Pub. No.: WO2014/118684
PCT Pub. Date: Aug. 7, 2014

(65) Prior Publication Data
US 2015/0367275 A1    Dec. 24, 2015

Related U.S. Application Data

(60) Provisional application No. 61/758,320, filed on Jan. 30, 2013.

(51) Int. Cl.
*B01D 53/02* (2006.01)
*B01D 53/04* (2006.01)
*B01D 53/047* (2006.01)

(52) U.S. Cl.
CPC ....... *B01D 53/0446* (2013.01); *B01D 53/047* (2013.01); *B01D 53/0415* (2013.01);
(Continued)

(58) Field of Classification Search
CPC .......... B01D 2256/12; B01D 2257/102; B01D 2257/104; B01D 2259/4533;
(Continued)

(56) References Cited

U.S. PATENT DOCUMENTS 5,256,172 A    10/1993    Keefer
5,370,113 A    12/1994    Parsons
(Continued)

FOREIGN PATENT DOCUMENTS

CA    2369949 A1    1/2003
CN    1162500 A    10/1997
(Continued)

*Primary Examiner* — Christopher P Jones
(74) *Attorney, Agent, or Firm* — Michael W. Haas

(57) ABSTRACT

The present invention refers to an oxygen separation system (10), comprising a support (12) for accommodating a plurality of autonomous oxygen separation units (14), wherein the support (12) comprises a plurality of fastening positions having fastening means for receiving an oxygen separation unit (14); and a plurality of autonomous oxygen separation units (14) being attached to said support (12), each oxygen separation unit (14) comprising at least one oxygen separation device (28) with an oxygen separation sorbent (30) being capable of separating oxygen from an oxygen comprising gas by sorbing at least one component of the oxygen comprising gas apart from oxygen, and a gas conveying device (44) for guiding a flow of oxygen comprising gas through the oxygen separation device (28). Such an oxygen separation system (10) may have significant improvements against the systems of the prior art, particularly referring to space, weight, energy consumption, variability, flexibility (Continued)

and maintenance behavior. The invention further relates to a method of generating a flow of oxygen enriched gas.

17 Claims, 2 Drawing Sheets

(52) U.S. Cl.
CPC .... *B01D 2256/12* (2013.01); *B01D 2257/102* (2013.01); *B01D 2257/104* (2013.01); *B01D 2259/4533* (2013.01); *B01D 2259/4541* (2013.01)

(58) Field of Classification Search
CPC ........ B01D 2259/4541; B01D 53/0415; B01D 53/0446; B01D 53/047

See application file for complete search history.

(56) References Cited

U.S. PATENT DOCUMENTS

| | | |
|---|---|---|
| 5,968,236 A | 10/1999 | Bassine |
| 6,547,851 B2 | 4/2003 | Warren |
| 6,551,384 B1 | 4/2003 | Ackley |
| 6,949,133 B2 | 9/2005 | McCombs |
| 7,510,601 B2 | 3/2009 | Whitley et al. |
| 7,604,004 B2 | 10/2009 | Jagger |
| 8,016,925 B2 | 9/2011 | McCombs |
| 2004/0050255 A1 | 3/2004 | Simonds |
| 2004/0107831 A1 | 6/2004 | Graham |
| 2006/0185668 A1 | 8/2006 | Jagger et al. |
| 2006/0185669 A1 | 8/2006 | Bassovitch |
| 2009/0308396 A1 | 12/2009 | McClain |
| 2011/0315140 A1 | 12/2011 | Shuman |
| 2012/0167883 A1 | 7/2012 | Taylor |

FOREIGN PATENT DOCUMENTS

| | | |
|---|---|---|
| JP | 2007167653 A | 7/2007 |
| JP | 2009125304 A | 11/2009 | ns
OXYGEN SEPARATION SYSTEM AND METHOD OF GENERATING A FLOW OF OXYGEN ENRICHED GAS

CROSS-REFERENCE TO RELATED APPLICATIONS

This patent application claims the priority benefit under 35 U.S.C. § 371 of international patent application no. PCT/IB2014/058549, filed Jan. 26, 2014, which claims the priority benefit under 35 U.S.C. § 119(e) of U.S. Provisional Application No. 61/758,320, filed on Jan. 30, 2013, the contents of which are herein incorporated by reference.

FIELD OF THE INVENTION

The present invention relates to the field of oxygen separation. In detail, the invention refers to an oxygen separation system and to a method of separating oxygen from an oxygen comprising gas in order to generate a flow of oxygen enriched gas.

BACKGROUND OF THE INVENTION

Oxygen generation, or oxygen separation, respectively, plays an important role in different application areas, covering for example the generation of high purity oxygen, and partial oxidation reactions of hydrocarbons in reactors. The production of high purity oxygen is also of particular interest for small, low noise oxygen generators for medical applications such as home healthcare applications.

Oxygen therapy, for example, is the administration of oxygen as a therapeutic modality. Oxygen therapy benefits the patient by increasing the supply of oxygen to the lungs and thereby increasing the availability of oxygen to the body tissues. The main homecare application of oxygen therapy is for patients with severe chronic obstructive pulmonary disease (COPD), a disease that effects more than 13 million patients in the US, for example.

For on-demand generation of oxygen, commercial solutions, so-called oxygen concentrators are known. Philips Respironics, for example, is offering a family of oxygen concentrator products for patients requiring oxygen therapy at home (EverFlo) and on the move (EverGo and SimplyGo). Such systems may be based on a pressure swing adsorption process.

Document U.S. Pat. No. 7,604,004 B2 describes an oxygen separator for separating oxygen from ambient air utilizing a vacuum swing adsorption process. Such an oxygen separator comprises a belt, a power module containing a power pack, a reservoir module, a control module containing a user interface and a separation cartridge module.

There is, however, still the need for improvements especially regarding an on-demand generation of oxygen by using pressure swing adsorption processes, or vacuum swing adsorption processes, respectively.

SUMMARY OF THE INVENTION

It is an object of the present invention to provide an oxygen separation system that provides at least one of improved maintenance behavior, improved variability and improved energy consumption.

This object is achieved by an oxygen separation system according to claim 1. This object is furthermore achieved by a method of generating a flow of oxygen enriched gas according to claim 12. Preferred embodiments may be derived from the dependent claims.

An oxygen separation system comprises a support for accommodating a plurality of autonomous oxygen separation units; and a plurality of autonomous oxygen separation units being attachable to said support, each oxygen separation unit comprising at least one oxygen separation device with an oxygen separation sorbent being suitable for separating oxygen from an oxygen comprising gas by sorbing at least one component of the oxygen comprising gas apart from oxygen, and a gas conveying device for guiding a flow of oxygen comprising gas through the oxygen separation device.

An autonomous oxygen separation unit according to the invention shall particularly mean a unit which is particularly self-contained and thus comprises the main components of an oxygen separation arrangement. In detail, each oxygen separation unit comprises at least one oxygen separation device and a gas conveying device, such as a compressor, being suitable for working with the respective oxygen separation device.

The term oxygen separation device may particularly refer to the active part of an oxygen separator. It may for example comprise an oxygen separation sorbent which may interact with an oxygen comprising gas, or with defined constituents of the latter, and may thus separate oxygen from the oxygen comprising gas by means of interaction with at least one constituent of the oxygen comprising gas apart from oxygen. Consequently, the oxygen separation device as such, or its oxygen separation sorbent, respectively, is capable of separating oxygen from an oxygen comprising gas particularly by sorption processes, such as adsorption processes. It may exemplarily be formed as a compact device being arranged in, or comprises a housing.

The term fastening position shall particularly refer to a position at which the oxygen separation unit is fixable to the support.

The term fastening means particularly may refer to any means which is capable of fixing an oxygen separation unit to the support. Non-limiting examples comprise pockets, knobs, and so on.

Additionally, the term oxygen comprising gas, as used herein, may refer to any gas which at least partly comprises gaseous oxygen, or which consists of oxygen. The term oxygen enriched gas shall thereby particularly mean a gas which has a higher concentration with respect to oxygen compared to the oxygen comprising gas and which may in an extreme case be pure oxygen. As a non-limiting example, the oxygen enriched gas may have an oxygen content in the range of 90% (+/−3%).

The term primary side of the oxygen separation device, as used herein, may refer to the side or the part of the oxygen separation device being directed towards the direction, at which the oxygen comprising gas is guided to the oxygen separation device, whereas the term secondary side of the oxygen separation device, as used herein, may refer to the side or the part of the oxygen separation device being directed towards the opposite side, i.e. to the side at which the generated pure oxygen or oxygen enriched gas is present.

An oxygen separation system like described above may provide at least one of improved maintenance, less energy consumption, and a higher degree of variability in its use.

In detail, the oxygen separation system comprises a plurality of autonomous oxygen separation units, each oxygen separation unit comprising at least one oxygen separation device with an oxygen separation sorbent being suitable for separating oxygen from an oxygen comprising gas by sorbing at least one component of the oxygen comprising gas apart from oxygen, and a gas conveying device for guiding a flow of oxygen comprising gas through the oxygen separation device.

Further a support is provided, the support being designed for accommodating a plurality of autonomous oxygen separation units. In order to accommodate the oxygen separation units, the support preferably comprises a plurality of fastening positions having fastening means each for receiving an oxygen separation unit.

The provision of a plurality of such autonomous oxygen separation units allows designing each unit very flexible in geometry as well as in size. This allows to highly adapting the oxygen separation system to the desired use with respect to geometry and size. For example, a housing may be formed not cylindrically but may have any suitable form. As a further example, most of the parts may be formed of a flexible material even more allowing adapting the form of the units to the desired application. This may further be improved by the fact that the oxygen separation system may be mounted in a highly distributed way due to the fact that several parts are used not being enclosed in one single housing but may be provided as several structural components.

Further, due to the fact that the plurality of oxygen separation units is fixed to a support by fastening means, it is easily possible to adapt the number of used units to the desired use by providing a modular arrangement. Therefore, the number, or amount, respectively, as well as the size of the respective units may be chosen in dependence of the required amount of generated oxygen enriched gas. This may, for example, be advantageous in case a patients disease gets stronger and thus more oxygen enriched gas has to be provided by time. It may then be possible to firstly provide a kind of base system which may be equipped with further oxygen separation units in case it is required. This allows a high degree of variability. Further, the oxygen separation system may be provided with strongly reduced size as well as weight, increasing the comfort for its user.

Further, due to the fact that every oxygen separation unit comprises its own gas conveying device, such as a compressor, only these gas conveying devices have to work which are desired for using the respective oxygen separation device. As a result, the required energy consumption of the system always relates to the amount of really generated oxygen enriched gas, or in other words, the needed power per really demanded flow rate in liter/min of the oxygen enriched gas is constant. Thus, the energy consumption may be reduced.

Additionally, due to the fact that every oxygen separation unit, which may be downscaled to a large extend, comprises its own gas conveying device, the requirements of the gas conveying devices, for example, may significantly be reduced resulting in a significantly reduced emitted noise of the gas conveying device thus improving the comfort of using such an oxygen separation system.

Moreover, due to the fact that a plurality of autonomous oxygen separation units is provided, a significant safety benefit is reached. In detail, even if one unit fails, for example by a failure of the gas conveying device or of an oxygen separation device, there are further units which may further generate oxygen enriched gas so that the failure of one of a plurality of oxygen separation units may be compensated or at least partially compensated by the further units. Therefore, the risk of the whole system to fail is significantly reduced, so that a patient, for example, may securely be provided with oxygen enriched gas due to the above described safeguard against total failure.

Next to providing a security aspect the maintenance behavior is additionally improved. This is due to the fact that the whole system may further work with a failed unit as the further units still may generate sufficient oxygen enriched gas. Further, it may be facilitated to exchange a failed unit by a further unit so that a repairing step may be performed in a shorter time period and with reduced costs.

Apart from that, due to the fact that a plurality of downscaled oxygen separation devices is provided, the heat generated during an oxygen separation step may be reduced. This may be more comfortable for a user and furthermore the requirements regarding a cooling step of the system may be reduced. Therefore, a cooling step may be achieved already by heat conduction by bringing every oxygen separation device, or every gas conveying device, respectively, in contact with a sufficiently large surface. The cooling of this surface may then be achieved by particularly unforced convection of the surrounding air. Further cooling may be achieved by feeding the exhaust flow and/or the feed flow along the surface, thereby increasing the convection and thus improving the cooling properties.

Additionally, the requirements of the materials of the whole system may be decreased. As an example, the pressure in the product tubes and thus in the tubes being arranged downstream the oxygen separation device can be hold at a pressure which approximately corresponds to atmospheric pressure. This may especially be the case if a product tank or a product line may be equipped with a further small gas conveying device, or compressor, respectively in order to convey the oxygen enriched gas to a user. As a result, the oxygen separation system is further very cost-saving to form.

Furthermore, the provision of a plurality of down scaled oxygen separation devices allows the oxygen separation system to come in its working balance more quickly allowing to also more quickly get well defined oxygen separation conditions and thus to generate oxygen enriched gas with a higher purity in a less amount of time.

As a result, an oxygen separation system like described above may have significant improvements against the systems of the prior art, particularly referring to space, weight, energy consumption, variability, flexibility and maintenance behavior.

According to an embodiment the plurality of autonomous oxygen separation units is detachably attachable to said support. According to this embodiment it is thus possible to choose not only the number but also the size of the oxygen separation units being fixed to the support on demand and thus directly before using the system. It is thus possible to always adapt the system very efficiently to the desired use and requirements. It is thus obvious that especially according to this embodiment the oxygen separation system is highly variable in its specifications, and thus applications. This is for example advantageous in case different users or different applications should be targeted at. Such a highly flexibly arrangement of the oxygen separation systems allows using it very energy efficient due to the fact that the required energy corresponds to the really generated oxygen enriched gas at every stage of usage. As a result, no excess energy is lost. Further, due to the fact that only the desired units are used, a reduced regular wear and thus further improved maintenance behavior may be achieved.

A further advantage may be reached in case each oxygen separation unit comprises an energy source, such as a battery. This allows designing each energy source to match with these components which strictly has to be provided with energy regarding power and size. The oxygen separation system may thus be provided with a significant reduction of weight, which may especially be advantageous for mobile uses.

According to a further embodiment the gas conveying device comprises a piezoelectric fluid pump. The provision of a piezoelectric fluid pump may be possible due to the fact that a plurality of oxygen separation devices are provided wherein each gas conveying device is associated to a limited number, in particular to one, oxygen separation device. As a result, each gas conveying device needs to deliver a significantly reduced flow in combination with a desired pressure of the oxygen enriched gas compared to the solutions of the prior art. This allows using a piezoelectric fluid pump which provides significant advantages. In detail, a piezoelectric fluid pump emits less noise compared to conventional gas compressors. Further, piezoelectric fluid pumps generally work with very high frequencies allowing increasing the acoustic insulation of the gas conveying device. Therefore, the comfort of using such an oxygen separation system may further be increased. Further, such a gas conveying device comes up with significantly reduced heat generation which further decreases the requirements regarding cooling of the system.

According to a further embodiment different gas conveying devices are arranged to work in a phase shifted manner. This allows providing a constant or at least nearly constant flow of oxygen enriched gas which may be advantageous in some applications. Further, by using the gas conveying devices in a phase shifted manner, or antiparallel manner, respectively, the emittance of noise may significantly be reduced. A phase shifted manner shall thereby mean that the process of oxygen generation comprising the feed phase during which oxygen enriched gas is generated and purge phase during which the oxygen separation device is regenerated forms a cycle of 360°, wherein the phase shift may be a defined amount of degrees, depending on the number of used oxygen separation units, or oxygen separation devices, respectively. For example, the phase shift may be defined by dividing the 360° cycle by the number of oxygen separation units, or gas conveying devices, respectively. This embodiment may be reached by providing a respective control unit which triggers the respective oxygen separation units or gas conveying devices correspondingly.

According to a further embodiment each autonomous oxygen separation unit is capable of providing a flow of oxygen enriched gas which corresponds to ≥5% to ≤30% of the total flow of oxygen enriched gas being providable by the oxygen separation system. According to this embodiment, the requirements for each of the oxygen separation units and thus of each oxygen separation device as well as of each gas conveying devices may be decreased especially significant regarding the solutions of the prior art comprising one compressor working in combination with generally two adsorption columns forming the whole system. As a result, it may be provided in an especially advantageous manner that the comfort, safety and flexibility as well as maintenance behavior of using such a system may especially be improved. As an exemplary value only, it may for conventional uses be provided that a total flow of oxygen enriched gas in a range of 1.0 L per minute shall be generated. By using an oxygen separation system especially according to this embodiment, each oxygen separation unit may be designed for generating a flow of oxygen enriched gas in the range of 0.1 L/min of oxygen enriched gas. As exemplary values only, in order to allow such a flow, the oxygen separation device, or the sieve bed, respectively, may contain about 10 g of adsorbent material, such as Li-zeolithe material. The required volume is therefore about 15 $cm^3$. Using cylindrical tubes as non-limiting example, the tubes can be provided with a diameter of 1.4 cm and a length of 10 cm. By using a small compressor like a small membrane pump, the whole oxygen separation unit may have dimensions in the range of 1.5 cm*3 cm*13 cm, for example.

According to a further embodiment the oxygen separation system excludes an additional product accumulator being arranged downstream the oxygen separation devices. This embodiment allows producing the oxygen separation system very cost-saving due the fact that this component may completely be omitted. Further, the space as well as weight of the pressure swing adsorption system may be reduced which may be especially advantageous for mobile applications. The omittance of a product assimilator, or product tank, respectively, may be possible due to the large number of small oxygen separation units and thus oxygen separation devices. Due to the fact that a plurality of oxygen separation devices is provided, the volume of the respective tubes coming from the respective devices already is an effective buffer space. This may especially but not exclusively be suitable in case the oxygen separation units are working phase shifted so that there are always a plurality of tubes being filled with oxygen enriched gas being suitable for most applications.

According to a further embodiment the oxygen separation system excludes a cooling device. This embodiment allows producing the oxygen separation system very cost-saving due the fact that this component may completely be omitted. Further, the space as well as weight of the pressure swing adsorption system may be reduced which may be especially advantageous for mobile applications. Further, the energy consumption may significantly be reduced due to the fact that a cooling device, such as a fan, always requires a big percentage of the totally required energy, so that the omittance of a cooling devices may largely effect the energy consumption. Due to the comparably reduced scale of each component of the oxygen separation units the cooling requirements may be reduced allowing to provide a suitable cooling already by bringing in contact each oxygen separation unit with a large surface, for example of the support or a means the support is fixed to. Thus a suitable cooling may already be achieved by unforced convection of the air surrounding the respective surfaces. As a non-limiting example, a heat transfer coefficient of 6-10 $W/K*m^2$ may already be reached.

According to a further embodiment the support is formed from a textile material. The provision of a textile support may provide the advantage that especially textile materials are very effective in reducing noise allowing especially significantly reducing noise emitted from the oxygen separation units, for example. Further, a textile material often has a limited weight and is further very comfortable to wear thus increasing the comfort of a user. A textile material may thereby be understood according to the invention as material, which may be a flexible woven material consisting of or comprising a network of natural or artificial fibres such as thread or yarn. Textiles may be formed by weaving, knitting, crocheting, knotting, or pressing fibres together, for example. Further in case a textile is used which has a big heat conductance, the cooling of the oxygen separation units may be performed especially effective even in case an additional cooling device is omitted. As a non-limiting example, a textile made from the material known as Terylen, which is a special polyethyleneterephthalate fibre may be used, as this fibre is very stable and has a heat conductance which is about 40 times higher compared to cotton.

For example, the support may be a piece of clothing. As an exemplary and non-limiting example, the support may be a coat or a vest. According to this embodiment the oxygen separation system is thus incorporated into a suitable clothing, thus allowing a superb comfort by using the same. In detail, no additional support has to be worn, but a clothing which is in use anyhow may solves the object of supporting the oxygen separation system. This allows that no additional arrangement, such as a case, has to be worn, which may improve the comfort for a user especially for mobile applications and for patients having diseases. This embodiment further provides additional advantages with respect to heat management due to the large surface and noise suppression.

According to a further embodiment the support is at least partly formed from a porous material. This allows especially efficiently adsorbing the noise being emitted from the oxygen separation units and thus reduces the noise of the oxygen separation system. As a result, the comfort of using a system according to this embodiment is especially improved.

According to a further embodiment an energy source is provided, which is adapted for providing energy to an additional electric load and thus to a load apart from the oxygen separation system. According to this embodiment, the oxygen separation system not only provides energy for its own usage, but further provides energy for further electric loads, such as smartphones, consumer electronics and the like. Accordingly, especially in case the oxygen separation system is used as a mobile system, it offers lots of possibilities to use it as a variable energy source, even more improving the variability and flexibility of the oxygen separation system. This embodiment may be achieved by providing one or more connection ports for connecting an electric load thereto.

With regard to further technical features and advantages of oxygen separation system it is referred to the respective description of the method, the oxygen separation unit and the figures.

A method of generating a flow of oxygen enriched gas by using an oxygen separation system like described above, comprises the steps of:

a) providing an oxygen separation system like described above;

b) guiding an oxygen comprising gas to the primary side of a plurality of oxygen separation devices by a plurality of gas conveying devices;

c) creating a pressure difference between the primary side and the secondary side of the plurality of oxygen separation devices, thereby forcing the oxygen comprising gas to flow through the oxygen separation devices, thereby producing a flow of oxygen enriched gas at the secondary side of the oxygen separation devices.

Such a method of generating a flow of oxygen enriched gas is very energy saving, comfortable and variable in its use.

In detail, the method comprises a step of providing an oxygen separation system like described above. With this regard, it is referred to the above description of the oxygen separation system.

According to a further step, an oxygen comprising gas is guided to the primary side of a plurality of oxygen separation devices by a plurality of gas conveying devices. The gas conveying devices may be piezoelectric fluid pumps which convey the gas to the oxygen separation devices. Further, the gas conveying devices, such as the piezoelectric fluid pumps, may create a pressure difference between the primary side and the secondary side of the oxygen separation device, thereby forcing the oxygen comprising gas to flow through the oxygen separation device, thereby producing a flow of oxygen enriched gas at the secondary side of the oxygen separation device.

According to an embodiment different oxygen separation devices are operated phase shifted. This allows providing a constant or at least nearly constant flow of oxygen enriched gas which may be advantageous in some applications. Further, by using the oxygen separation devices and particularly the gas conveying devices in a phase shifted manner, or antiparallel manner, respectively, the emittance of noise may significantly be reduced. A phase shifted manner shall thereby mean that the process of oxygen generation comprising the feed phase during which oxygen enriched gas is generated and purge phase during which the oxygen separation device is regenerated forms a cycle of 360°, wherein the phase shift may be a defined amount of degrees, depending on the number of used oxygen separation units, or oxygen separation devices, respectively. For example, the phase shift may be defined by dividing the 360° cycle by the number of oxygen separation devices.

According to a further embodiment each of the plurality of oxygen separation units provides a flow of oxygen enriched gas in an amount of ≥5% to ≤30% of the totally generated flow of oxygen enriched gas. According to this embodiment the requirements for each of the oxygen separation units and thus of each oxygen separation device as well as of each gas conveying device may be decreased especially significant regarding the solutions of the prior art comprising one compressor working in combination with generally two adsorption columns totally. As a result, it may be provided in an especially advantageous manner that the comfort, safety and flexibility as well as maintenance behavior of using such a system may especially be improved. As an exemplary value only, it may for conventional uses be provided that a total flow of oxygen enriched gas in a range of 1.0 L per minute shall be generated. By using an oxygen separation system especially according to this embodiment, each oxygen separation unit may be designed for generating a flow of oxygen enriched gas in the range of 0.1 L/min of oxygen enriched gas.

With respect to further technical features as well as advantages of the method according to the invention it is referred to the description of the oxygen separation system, the oxygen separation unit and the figures.

An oxygen separation unit is attachable to a support of an oxygen separation system like described above. The oxygen separation unit comprises at least one oxygen separation device with an oxygen separation sorbent being capable of separating oxygen from an oxygen comprising gas by sorbing at least one component of the oxygen comprising gas apart from oxygen, and a gas conveying device for guiding a flow of oxygen comprising gas through the oxygen separation device.

Such an oxygen separation unit is usable in connection with a support and thus forms, together with the support, an oxygen separation system. With this regard, it is referred to the above description of the oxygen separation system.

Such an oxygen separation unit thus provides the advantages of being very energy saving, comfortable and variable in its use.

With regard to further technical features and advantages of oxygen separation unit it is referred to the respective description of the method, the oxygen separation system and the figures.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
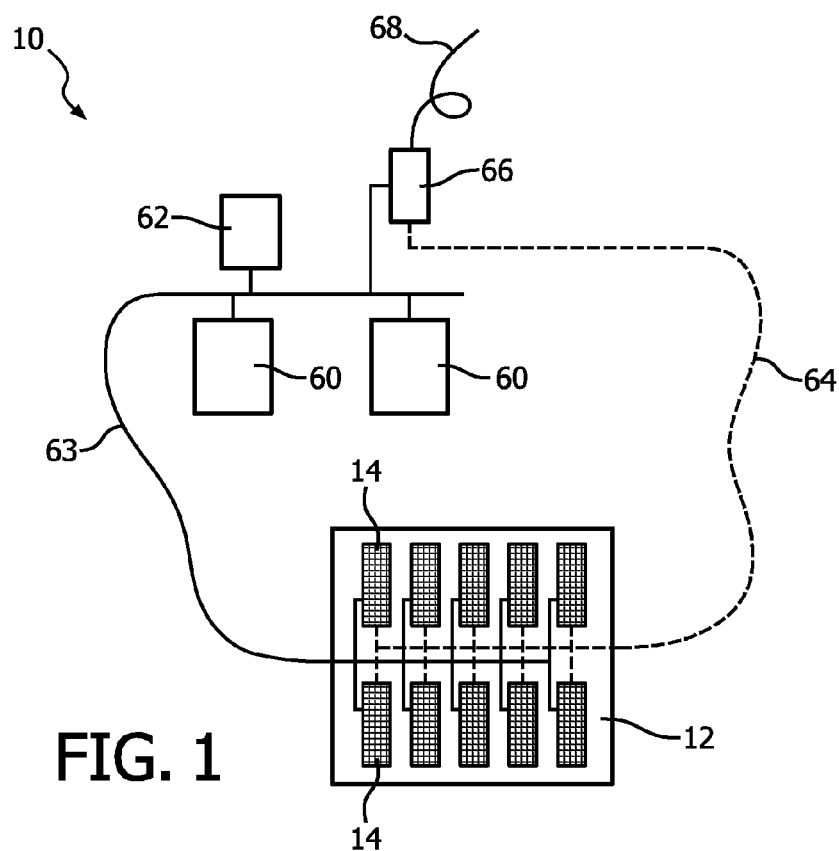
FIG. 1 shows an embodiment of an oxygen separation system according to the invention.

In FIG. 1, an oxygen separation system 10 for generating oxygen is schematically shown. The oxygen separation system 10 may be formed as a pressure swing adsorption system and may be used for generating oxygen with respect to medical uses or therapeutic applications, respectively, for example in the field of COPD treatment. The oxygen separation system 10 may be designed as a stationary arrangement, for example for using it in a hospital, or it may be a portable device, for example for using it in the field of homecare applications. However, the oxygen separation system 10 may furthermore be used for any application at which pure or essentially pure oxygen has to be provided, for example in air planes or for welding purposes. Such an oxygen separation system 10, or oxygen concentrator, respectively, may be based on an oxygen concentrator such as the one called EverGo and which is purchasable from Philips Respironics.

The oxygen separation system 10 comprises a support 12 for accommodating a plurality of autonomous oxygen separation units 14. The support 12 may be formed from a textile material and/or porous material and may further act as a surface for heat dissipation. Further, the support 12 comprises a plurality of fastening positions for example each of them having fastening means for receiving an oxygen separation unit 14 and thus to fix, or attach, respectively, the plurality of oxygen separation units 14 to the support 12 at the fastening positions. According to FIG. 1, ten oxygen separation units 14 are connected to the support 12. For example, the plurality of autonomous oxygen separation units 14 may be detachably attachable, or attached, respectively, to said support 12. Further, each autonomous oxygen separation unit 14 may be capable of providing a flow of oxygen enriched gas which corresponds to ≥5% to ≤30% of the total flow of oxygen enriched gas being providable by the whole pressure swing adsorption system 10. The oxygen separation unit 14 is shown in detail in FIG. 2 which shows a preferred but in no way limiting example of a pressure swing adsorption system.

Figure 2:
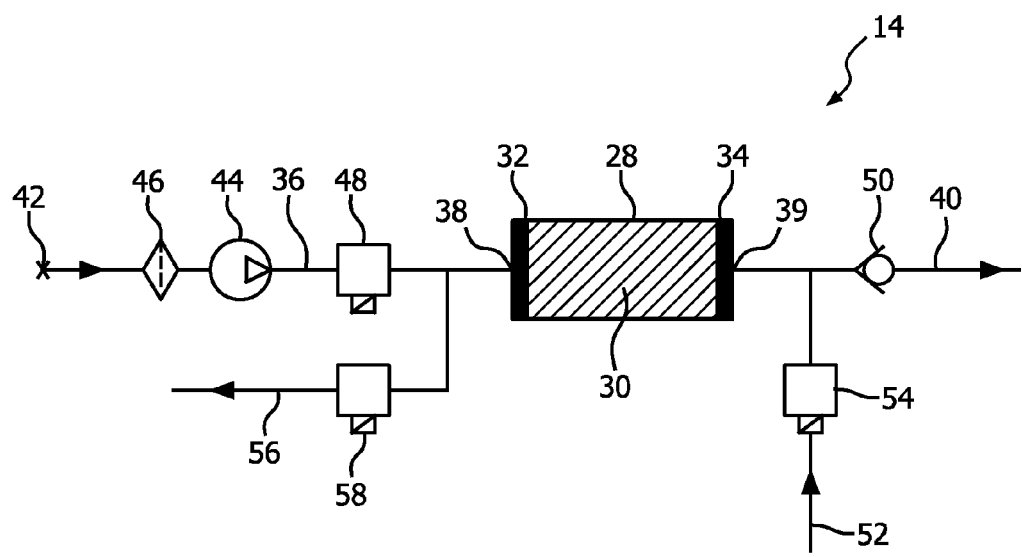
FIG. 2 shows an embodiment of an oxygen separation unit for use in an oxygen separation system according to the invention.
Figure 3:
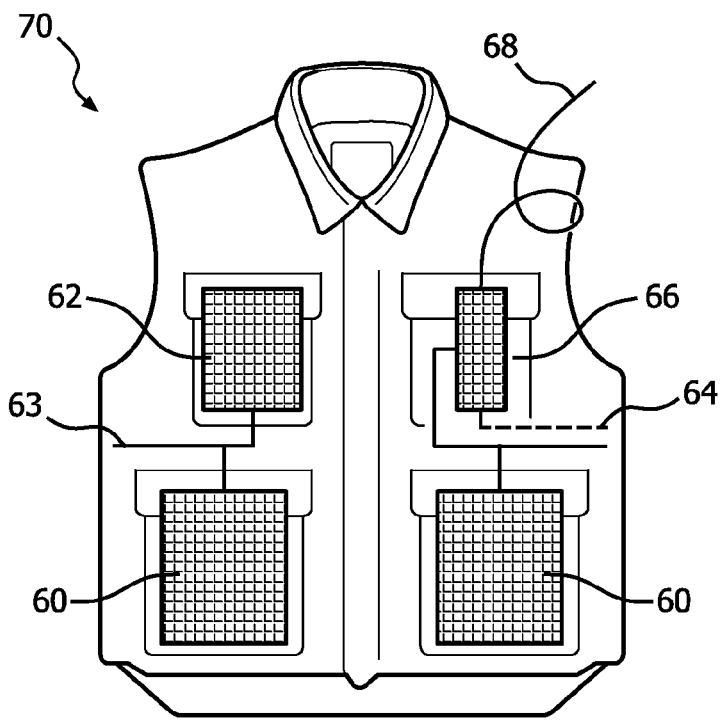
FIG. 3 shows a further embodiment of an oxygen separation system according to the invention.

According to FIG. 2, the oxygen separation unit 14 comprises at least one, preferably exactly one, oxygen separation device 28 which is capable of separating oxygen from an oxygen comprising gas. However, especially in case the oxygen separation system 10 shall be used as pressure swing adsorption system (PSA), vacuum swing adsorption system (VSA) or a combination thereof (PVSA), it may be preferred that each oxygen separation unit 14 comprises exactly two oxygen separation devices 28 as the number of gas conveying devices may be limited although the advantages like described may be achieved. The oxygen separation device 28 may be equipped with an oxygen separation sorbent 30. The oxygen separation sorbent 30 is particularly configured for letting oxygen pass at least in a large amount without significantly impeding its flow, but for interacting with, or sorbing, respectively other components being present in an oxygen comprising gas. In case air is used as oxygen comprising gas, it is thus preferred that the oxygen separation sorbent 30 is configured for sorbing nitrogen, or adsorbing nitrogen, respectively. Suitable oxygen separation sorbents may comprises a zeolite material such as a lithium zeolite material. However it may be possible to use every suitable oxygen separation sorbent known in the art, for example for use in pressure swing adsorption processes. The oxygen separation sorbent 30 is thereby held in place by an inlet filter 32 and an outlet filter 34, for example pressed against the sorbent 30 by means of spring forces.

An inlet conduct 36 is provided for guiding a flow of oxygen comprising gas to the gas inlet 38 of the oxygen separation device 22 at its primary side. Furthermore, an outlet conduct 40 for guiding oxygen enriched gas, or pure oxygen, respectively, out of the oxygen separation device 28, or its outlet 39, is provided.

The inlet conduct 36 of the oxygen separation device 28, or of all present oxygen separation devices 28 of all oxygen separation units 14, is connected to an inlet 42 of the oxygen separation system 10. Connected to the inlet 42 may be a source of oxygen comprising gas, such as a gas storing device or the air surrounding the oxygen separation system 10. Additionally, a gas conveying device 44 for creating a pressure difference between the primary side and the secondary side of the oxygen separation device 28 may be provided. The gas conveying device 44 may, for example, be a piezoelectric fluid pump. Downstream or upstream the gas conveying device 44, an air inlet filter 46 may be provided in order to provide a first cleaning step of the oxygen comprising gas. In detail, especially solid particles may be filtered out of the oxygen comprising gas. The inlet filter 46 may be part of the oxygen separation unit 14, or it may be provided only once downstream the inlet 44.

In order to allow the oxygen comprising gas to be guided through the oxygen separation device 28, an inlet valve 48 may be provided in the inlet conduct 36. A valve according to the invention shall be any device which may allow a gas flow, inhibit a gas flow and/or regulate the amount of a gas flow. Further, a valve 50, such as a check valve, may be provided in the outlet conduct 40. Further, a purging conduct 52 with a respective valve 54 may be provided together with an exhaust conduct 56 and a respective exhaust valve 58 in order to purge the oxygen separation device 28 with oxygen enriched gas and thus for regenerating the oxygen separation sorbent 30 like will be apparent in detail down below.

Coming back to FIG. 1, the oxygen separation system 10 further comprises one or more power sources 60 for providing energy to the oxygen separation system 10. The energy source 60 may further be adapted for providing energy to an additional electric load. An energy source 60 may further be part of each oxygen separation unit 14. Further, a control logic 62 is provided for controlling the oxygen separation system 10. The control logic 62 as well as the energy source 60 may thus be connected to the oxygen separation units 14, for example, by respective power and control connectors and a power and control line 63.

Connected to the oxygen separation units 14, or the respective oxygen separation devices 28 thereof, particularly to the outlet conducts 40 of the respective oxygen separation units 14 is further a particularly flexible product tube 64, which guides the generated oxygen enriched gas to a user, for example via a product accumulator 66 and a product delivery tube 68. However, it has to be noted that regarding the oxygen separation system 10, such a system 10 may exclude an additional product accumulator 66 being arranged downstream the oxygen separation units 14. Further, the oxygen separation system 10 may comprise a cooling device, such as a fan, or it may exclude a cooling device. Therefore, the size of the support surface may be chosen to come up with sufficient cooling of the oxygen separation units 14 leading to cooling by unforced convection of surrounding air.

The above described oxygen separation system 10 may work in a non-limiting manner as follows as a pressure swing adsorption system. Firstly an oxygen comprising gas is guided to the primary side of the plurality of oxygen separation devices 28 by the plurality of gas conveying devices 44 being part of each oxygen separation unit 14. The oxygen comprising gas may thereby be guided to the oxygen separation devices 28 through the inlet 42, which may be connected to a plurality of inlet tubes 36, each being part of an oxygen separation unit 14. By further creating a pressure difference between the primary side and the secondary side of the oxygen separation device 28, especially by means of the gas conveying device 44, the oxygen comprising gas is forced to flow through the oxygen separation device 28, thereby producing a flow of oxygen enriched gas at the secondary side of the oxygen separation device 28 by interacting with the oxygen separation sorbent material 30. The oxygen enriched gas is in turn guided through an outlet conduct 40 to the product tube 64 and further to the user. Thereby, the plurality of outlet conducts 40 of each oxygen separation unit 14 may be combined to one product tube 64. The oxygen separation system 10 may work, for example, by a phase shifted operation of the oxygen separation devices 14. Further, it may be provided that each of the oxygen separation units 14 provides a flow of oxygen enriched gas in an amount of ≥5% to ≤30% of the totally generated flow of oxygen enriched gas.

By controlling the valves 48, 54, and 58 of the respective oxygen separation units 14, it may be defined which oxygen separation unit 14 is working at the moment and which unit is operated in which working phase.

In order to remove the sorbed substance or substances from the oxygen separation sorbent material 30, the sorbent material 30 is provided with a gas flow in the reversed direction, particularly by reversing the pressure behavior upstream and downstream the sorbent 30, and thus by a pressure swing. Therefore, the respective valves 48, 54, and 58 of the oxygen separation unit 14 may be controlled such, that freshly generated oxygen enriched gas is guided through the purge line 52, the oxygen separation device 28 and the exhaust line 56. This may, for example, be achieved, in case the purge line 52 is connected to the product line 64 or to an outlet tube 40 of a further oxygen separation unit 14.

In case two oxygen separation devices 28 are provided in each respective unit 14, the purge valve 54 may be exchanged by an orifice between outlet conducts of the respective oxygen separation devices 28, wherein the orifice may be positioned in a connecting line of the respective outlet conducts, the connecting line exchanging the purge line which is a very simple and cost-saving arrangement.

If the oxygen separation units 14 are operated with a cycle time of the unit of $t_{cyc} \gg 1$ s, the maximum inflows and outflows as well as the power for switching the valves is reduced. An inflow of the compressor is preferred to not interfere with the exhaust gas.

Figure 4:
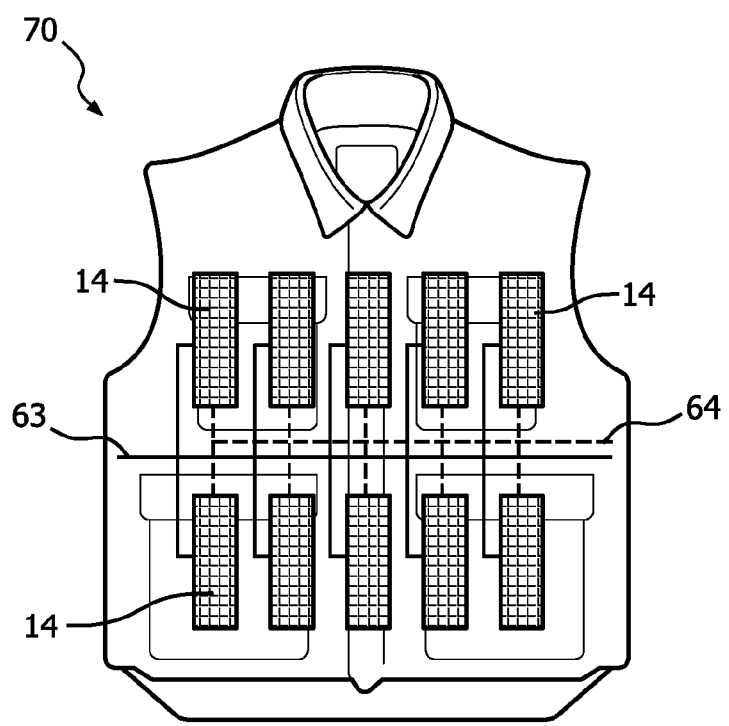
FIG. 4 shows a further view of the embodiment according to FIG. 4.

According to FIGS. 4 and 5, a special embodiment of the oxygen separation system 10 is shown. According to this embodiment, the oxygen separation system 10 is included into a piece of clothes, in detail into a vest 70 and thus the oxygen separation system 10 is a wearable system. In FIG. 4, the front side of the vest 70 is shown. The front side of the vest 70 may comprise the control logic 62, one or more power sources 60 and at least partly the power and control line 63 being connected to the control logic 62 and energy source 60. Further, the product tube 64 may be guided to said front side and may be connected to the product accumulator 66 and further to the product delivery tube 68.

In FIG. 5, the respective components of the back side of the vest 70 are shown. The back side may comprise the oxygen separation units 14 according to this embodiment being connected to the energy source 60 and to the control logic 62 by the power and control lines 63 like described with regard to FIG. 1. Further, the oxygen separation units 14, or their oxygen separation devices 28, are connected to the product tube 64. Each component may be fixed to the vest, for example, by respective fixing means or pockets or the like and they may further be included to the inner side of the vest 70 so that they are not visible from the outside. Further, the heat generated may be guided to the outside resulting in an especially preferred heat management due to a large surface being in contact with surrounding air. Further, the heat may be used for heating the user, which may be comfortable especially during winter times.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An oxygen separation system, comprising:
  a support; and
  a plurality of autonomous oxygen separation units being detachably attached to said support, each oxygen separation unit comprising
    at least one oxygen separation device with an oxygen separation sorbent being suitable for separating oxygen from an oxygen comprising gas by sorbing at least one component of the oxygen comprising gas apart from oxygen,
    a gas filter for filtering solid particles from the oxygen comprising gas, and
    a gas conveying device for guiding a flow of the filtered oxygen comprising gas through the oxygen separation device, and wherein the gas conveying device comprises a compressor.

2. The oxygen separation system according to claim 1, wherein each oxygen separation unit comprises an energy source.

3. The oxygen separation system according to claim 1, wherein the compressor is a piezoelectric fluid pump.

4. The oxygen separation system according to claim 1, wherein different gas conveying devices are arranged to work in a phase shifted manner.

5. The oxygen separation system according to claim 1, wherein each autonomous oxygen separation unit is capable of providing a flow of oxygen enriched gas which corresponds to ≥5% to ≤30% of the total flow of oxygen enriched gas being providable by the oxygen separation system.

6. The oxygen separation system according to claim 1, wherein the oxygen separation system excludes an additional product accumulator being arranged downstream the oxygen separation devices.

7. The oxygen separation system according to claim 1, wherein the oxygen separation system excludes a cooling device.

8. The oxygen separation system according to claim 1, wherein the support is formed from a textile material.

9. The oxygen separation system according to claim 1, wherein the support is at least partly formed from a porous material.

10. The oxygen separation system according to claim 1, wherein an energy source is provided, which is adapted for providing energy to an additional electric load.

11. Method of generating a flow of oxygen enriched gas, comprising the steps of:
   a) providing an oxygen separation system comprising: a support for accommodating a plurality of autonomous oxygen separation units, and a plurality of autonomous oxygen separation units being attachable to, and detachably attachable to said support, each oxygen separation unit comprising at least one oxygen separation device with an oxygen separation sorbent being suitable for separating oxygen from an oxygen comprising gas by sorbing at least one component of the oxygen comprising gas apart from oxygen, and a gas conveying device for guiding a flow of oxygen comprising gas through the oxygen separation device, and wherein the gas conveying device comprises a compressor;
   b) guiding an oxygen comprising gas to the primary side of the plurality of oxygen separation devices by a plurality of gas conveying devices;
   c) creating a pressure difference between the primary side and the secondary side of the plurality of oxygen separation devices, thereby forcing the oxygen comprising gas to flow through the oxygen separation devices, thereby producing a flow of oxygen enriched gas at the secondary side of the oxygen separation devices.

12. Method according to claim 11, wherein different oxygen separation devices are operated phase shifted.

13. Method according to claim 11, wherein each of the plurality oxygen separation units provides a flow of oxygen enriched gas in an amount of ≥5% to ≤30% of the totally generated flow of oxygen enriched gas.

14. The oxygen separation system according to claim 1, wherein the support is a coat or a vest.

15. The oxygen separation system according to claim 1, wherein the air filter is disposed between the oxygen separation device and the gas conveying device.

16. The oxygen separation system according to claim 1, wherein the air filter is disposed between an inlet of the oxygen separation system and the gas conveying device.

17. The oxygen separation system according to claim 1, further comprising a purging conduct connected at an output side of the oxygen separation device, the purging conduct guiding flow of oxygen enriched gas into the oxygen separation device for regenerating the oxygen separation sorbent.

* * * * *